United States Patent Office 2,884,982
Patented May 5, 1959

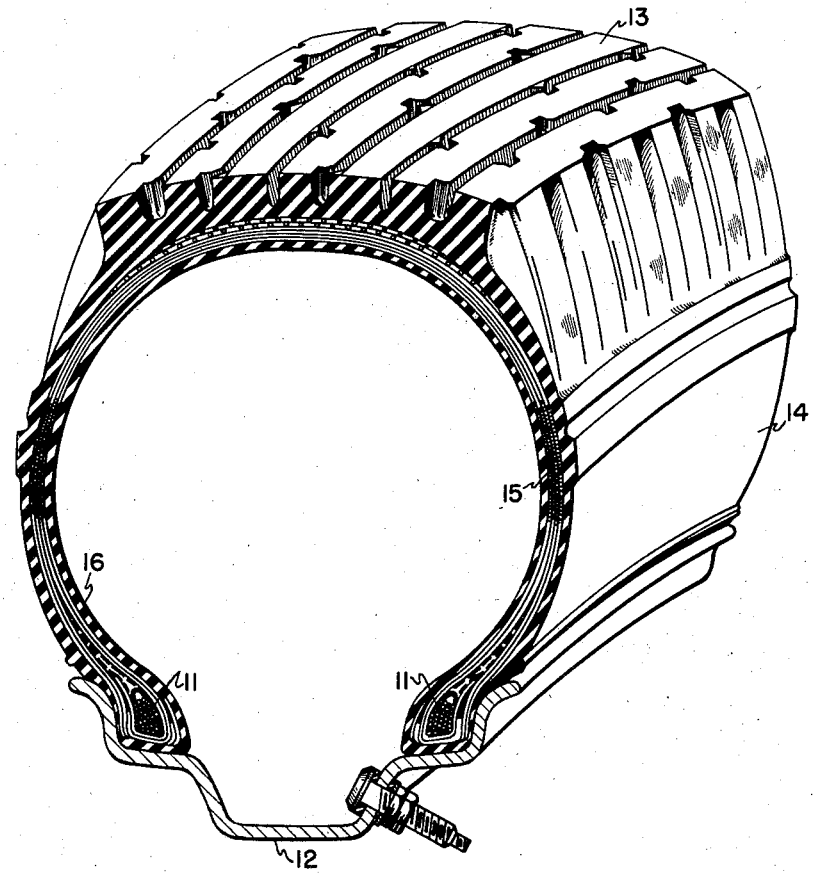

2,884,982

BUTYL RUBBER TIRE TREAD COMPOSITIONS, PROCESS FOR PREPARATION AND TIRE CONTAINING SUCH COMPOSITION

William J. Sparks, Westfield, Robert E. Clayton, Roselle Park, and John R. Briggs, Westfield, N.J., assignors to Esso Research and Engineering Company, a corporation of Delaware Application May 26, 1955, Serial No. 511,277

11 Claims. (Cl. 152—330)

This invention relates to vulcanizable rubbery polymeric compositions of improved wear resistance which, when vulcanized are suitable for rubber tires; and more particularly relates to vulcanizable copolymers of iso-olefins and diolefins in composition with unreclaimed comminuted vulcanized butyl rubber scrap.

In another aspect, the present invention comprises a process for forming an improved butyl rubber which is suitable for tires, which process comprises adding to a major proportion of unvulcanized butyl rubber, a minor proportion of unreclaimed comminuted vulcanized butyl rubber scrap and vulcanizing the resulting composite to produce a rubber of increased wearing resistance.

Copolymers of an olefin, preferably an iso-olefin, and a multi-olefin, such as a tri-olefin, and/or an unconjugated multi-olefin and especially where the copolymer is of isobutylene with a conjugated diolefin are referred to in the literature as "Butyl Rubber" or GR-I rubber (Government Rubber-Isobutylene).

The expression "Butyl Rubber" as employed herein is defined to include a copolymer of about 90–99.5% of an iso-olefin of about 4–7 carbon atoms and about 10–0.5% of a conjugated multi-olefin of about 4–14 carbon atoms and preferably about 4–8 carbon atoms. However, any equivalents of such vulcanizable copolymers such as above disclosed or other known equivalents are intended to be within the purview of the present invention.

Butyl rubber, as referred to in the prior art and made by such processes as the processes of U.S. Patents 2,356,128; 2,384,975; 2,399,672; 2,418,912; 2,607,764 and equivalent processes as disclosed in other patents and in the literature, is ideally suited for premium grade rubber tire treads. Nevertheless, heretofore it has not been possible to produce a premium grade butyl rubber tire with satisfactory wearing qualities desired unless all fresh polymer was used. However, the economics of the rubber industry in general indicate that approximately 21% of the rubber used in rubber tires is reclaimed rubber (i.e. devulcanized rubber) e.g. "Rubber Age" of March 1954 with reference to disclosure by Department of Commerce showing that 298,191 long tons of reclaimed rubber were produced in 1953.

However, the reclaiming of any rubber including butyl rubber is expensive. Furthermore, reclaiming has been found to lower the tensile strength and abrasive resistance of rubber.

Typical processes for reclaiming rubber in general contemplate the autoclaving of the used rubber for extended periods of time up to about 20 hours in the presence of saturated steam and up to pressures of about 100–500 p.s.i.g. with the optional addition of various chemicals and oils to include alkalis, acids, pine tar, dipentene, coal tar solvent naphtha, petroleum oils, or various combinations of such chemicals, or their equivalents for reclaiming purposes.

Also, in the treatise on synthetic rubber "Synthetic Rubber" by Whitby, published 1954, various procedures for reclaiming rubbers are described. However, there has not been found a satisfactory chemical agent which produces the desired penetration of butyl rubber without excessive softening, i.e., the reclaimed butyl rubber has always lost tensile strength and abrasive resistance. Therefore, since none of the prior art methods of reclaiming butyl rubber have been found to produce butyl rubbers of satisfactory abrasive resistance, "used" butyl rubber has not been commercially employed heretofore in premium grade tires.

By the present invention it is now possible to produce a butyl rubber composition which includes substantial quantities of "used" butyl rubber and without the necessity for reclaiming the butyl rubber added. This is accomplished by adding to about 60–95 wt. percent (preferably about 75–90 wt. percent) of unvulcanized butyl rubber, about 5–40 wt. percent (preferably about 10–25 wt. percent) of unreclaimed comminuted vulcanized butyl rubber scrap and subsequently vulcanizing the composite to produce a rubber of increased wear resistance.

In one embodiment of the present invention, the vulcanized rubbery composition is produced by a process which comprises heating in the presence of vulcanizing amounts of sulfur, about 100 parts by weight of a copolymer of about 70–90% of a $C_4$–$C_7$ iso-olefin (especially about 90–99% isobutylene) and about 1–30% of a $C_4$–$C_{14}$ multi-olefin (especially 10–1% isoprene), and advantageously in the presence of an accelerator. Suitable accelerators for the vulcanization of butyl rubber may be found in the above cited patents and in the literature. A particularly advantageous accelerator comprises about 0.5–2.0 parts and preferably about 0.75–1.2 parts by weight of a compound of the formula:

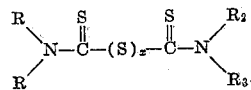

wherein R, $R_1$, $R_2$ and $R_3$ represent aliphatic hydrocarbon radicals and preferably alkyl groups having about 1–6 carbon atoms, and preferably about 1–2 carbon atoms and $x$ represents an integer of about 1–5 and is preferably 2. For instance, tetramethyl thiuram disulfide has been found to be a particularly advantageous accelerator.

In another embodiment of the invention, to 100 parts of the copolymer suitable for use in tire treads are added the following: 30–70 parts by weight of carbon black, 0–1 part by weight of Polyac (30% p-dinitrosobenzene, 70% inert mineral filler), 0–5 parts by weight of stearic acid as a mold release agent, 0.30 parts by weight of a plasticizer oil, 3–20 parts by weight of zinc oxide, 0–2 parts by weight of benzothiazyl disulfide, 0.5–2.0 parts by weight of tetramethyl thiuram disulfide, and about 1–5 parts by weight or more of sulfur. This total composition is then vulcanized.

Preferably, the vulcanizable constituents comprise a copolymer of about 70–99% (especially 90–99%) of isobutylene and about 30–1% (especially 10–1%) of a conjugated diolefin such as isoprene, butadiene, dimethyl butadiene, myrcene, piperylene, and allo-ocimene, etc. Copolymers of isobutylene and isoprene are preferred.

The preparation of butyl rubbers in general is as follows:

A low molecular weight iso-olefin, preferably isobutylene, is reacted with a conjugated diolefin, preferably isoprene at relatively low temperatures, namely below 0° C. and preferably from about −10° C. to about −180° C. or lower; an advantageous range being from about −40° C. to −160° C. The ratio of the reactants in the feed varies with the type of diolefin, e.g. about 50–90, preferably 60–80 parts by weight of the iso-olefin to about 50–10, preferably 40–20 parts by weight of butadiene as the conjugated diolefin or 90–99% isobutylene and 10–1% of isoprene. However, where the conjugated diolefin is isoprene, the iso-olefin-diolefin ratio is about 70–99%, especially 90–99% of the iso-olefin to about 30–1%, especially 10–1% of the multi-olefin. The preferred catalyst is a Friedel-Crafts catalyst such as aluminum chloride preferably dissolved in a suitable inert solvent, e.g. an alkyl halide such as ethyl or methyl chloride, or carbon disulfide. About 1–10 or so volumes of inert diluent for the reactants may be used, e.g. methyl chloride, butane, heptane, etc. The resulting copolymer preferably has a Staudinger molecular weight between about 25,000 and 200,000 (a viscosity average molecular weight of about 250,000 up to about 1 million) and about 0.5–30%, especially about 0.5–10% of the multi-olefin. When so prepared, the material is rubbery in nature, has the property of being curable with sulfur and also with non-sulfur curing aids such as p-dinitrosobenzene, p-quinone dioxime, etc. and their various homologs and derivatives and combinations thereof, and in the presence of conventional accelerators, and especially in the presence of organic polysulfides of the tetra-alkyl thiuram polysulfide type mentioned above.

The cure may be effected in the presence of sulfur or combined with such materials as one or more of the following or their equivalents:

(1) A zinc dialkyl polythiocarbamate,
(2) Lead oxide,
(3) p-Quinone dioxime,
(4) Benzothiazyl disulfide and p-quinone dioxime,
(5) p-Quinone dioxime dibenzoate and lead oxide, etc.

The copolymer which has been cured, as a satisfactory elastic limit, tensile strength, abrasion resistance, and flexure resistance; and the mixture, before curing, may be compounded with various fillers, pigments, plasticizers, anti-oxidants, etc.

The present invention contemplates vulcanizing butyl rubber compositions of the types mentioned with unreclaimed comminuted vulcanized butyl rubber. For example, the vulcanizable compositions of the present invention may comprise about 60–95% of a rubbery copolymer of a minor proportion of a conjugated multi-olefin of about 4–10 carbon atoms and a major proportion of an iso-olefin of about 4–7 carbon atoms with about 5–40% of an unreclaimed comminuted vulcanized rubber copolymer scrap of approximately the same ratio of multi-olefins to iso-olefins. In a preferred aspect, the composition comprises about 70–95% by weight of unvulcanized butyl rubber and about 5–30 weight percent of unreclaimed comminuted vulcanized butyl rubber scrap. As regards the anti-oxidant, small amounts of any conventional anti-oxidant for butyl rubber such as phenyl-beta-naphthylamine or either alkylated aromatic hydrocarbons or alkylated heterocyclics may be employed in amounts of about 0.1% to about 2% by weight depending upon the particular anti-oxidant. For example, alkylated bisphenols have been found particularly advantageous as have been alkylated aminophenols and alkylated diphenylamines. The alkyl groups generally do not contain more than about 16 carbon atoms.

Also, in another advantageous embodiment, the vulcanizable rubbery polymeric composition comprises about 75 to about 90 weight percent of an unvulcanized copolymer and about 10 to about 25 weight percent of unreclaimed comminuted vulcanized copolymer wherein the copolymer comprises in each case the reaction product of about 80–99 parts by weight of a $C_4$–$C_7$ iso-olefin and about 20–1 parts by weight of a $C_4$–$C_{14}$ conjugated diolefin and in each instance about 100 parts of the copolymer has been admixed prior to vulcanization with about:

30–75 parts by weight carbon black
0–1 part by weight p-dinitrosobenzene
0–5 parts by weight stearic acid
0–30 parts by weight of a plasticizer oil (hydrocarbons, esters, etc.)
1–30 (preferably 3–20 parts) by weight zinc oxide
0.5–5.0 parts by weight of sulfur
0.5–2.0 parts by weight of a tetra alkyl thiuram sulfide
0–2.0 parts by weight of benzothiazyl disulfide The general characteristics for a suitable plasticizer hydrocarbon oil may be as follows or its equivalents:

|  | Preferred | Minimum | Maximum |
| --- | --- | --- | --- |
| API° Gravity | 15–28 | 10 | 35 |
| Flash Point, °F. (Open Cup Method) | 525 | 300 | 700 |
| Pour Point, °F | 15–30 | 10 | 60 |
| SSU @ 100° F | 100–12,000 | 50 | 20,000 |

The carbon black added may be a channel carbon black, such as HPC black, MPC black, EPC black, or a furnace black such as HAF black, SAF black, HMF black, etc., or any combination of such blacks.

The invention will be more apparent from the following runs, tests, examples and the accompanying drawing in which:

The single figure is a cross-sectional view in perspective of a pneumatic tubeless tire employing therein the butyl rubber of the present invention wherein the tire is depicted as being mounted on a conventional tubeless-type of tire wheel-rim.

The pneumatic tubeless tire comprises a hollow toroidal-type member which is substantially U-shaped in cross-section by virtue of an open portion which extends around the inner periphery of the member. In other words, the member is of a tubular type structure which has a cross-section in the form of an open-bellied body with spaced terminal portions to define a member generally resembling a horseshoe wherein the open portion of the horseshoe-shaped member faces toward the interior circumference of said member. The terminal portions constitute the bead portions 11—11 of the tire, inside of which are a plurality of bead wires adhesively imbedded and molded in a rubber.

The outer surface of the bead portion is advantageously shaped so as to function an air sealing means, such as a plurality of ribs to aid in adhesion to rim 12 when the tire is inflated. The remaining outer surface of the tire also includes tread area 13 and sidewalls 14. The remaining construction of the tire may vary according to conventional fabrication but in general the tire is a multi-layered type of structure with an outer layer as abovementioned. The layer next adjacent the outer layer generally comprises a carcass 15 which includes a rubber, such as butyl rubber, natural rubber, GR-S rubber, etc., which has incorporated therein a fabric composed of a plurality of cotton, rayon, or nylon cords, etc. The tire also includes an inner lining 16, advantageously made from butyl rubber which must be substantially impermeable to air. The lining may also advantageously comprise a rubbery copolymer of about 20–99 wt. percent of a $C_4$–$C_7$ iso-olefin, such as isobutylene, and about 1–80 wt. percent of a $C_4$–$C_{14}$ multi-olefin, such as isoprene which has been at least partially vulcanized at least at about 240°–350° F. with from about 0.2–10.0 wt. percent sulfur based on the weight of the copolymer. The above multi-layers, at least three in number, are conventionally bonded and adhered together; for example, by vulcanization to form a tire of a unitary structure.

The butyl rubber composition of the present invention, i.e including a minor proportion of comminuted vulcanized butyl rubber scrap, may be generally employed throughout the tire, but is especially desirable in the tread area because of its improved abrasion resistance. However, in certain areas of the tire, ordinary butyl rubber is applicable. In one embodiment, a tubeless tire comprises a casing of an outer layer including the tread, sidewall, outer bead portion of a vulcanized mixture of unvulcanized butyl rubber and unreclaimed comminuted vulcanized butyl rubber scrap. It also comprises an intermediate layer or carcass of ordinary vulcanized butyl rubber, and an inner layer of butyl rubber which has been at least partially vulcanized by heating for about 3–60 minutes or more at about 240°–350° F. with about 0.2–10.0 wt. percent (preferably about 0.5–4.0 wt. percent) sulfur on a basis of the weight of the butyl rubber.

The following butyl rubber was prepared:

BUTYL #1

A copolymer of isobutylene and isoprene was prepared as above outlined by mixing 99 parts by weight of isobutylene of 98% purity with 1 part by weight of isoprene of 96% purity. This material was diluted with approximately 250 parts by weight of liquid methyl chloride and cooled to a temperature of about $-164°$ C. To this cold mixture there was then added approximately 150 parts by weight of liquid methyl chloride containing dissolved therein approximately 2.5 parts by weight of aluminum chloride. The aluminum chloride solution was added in the form of a fine jet under pressure to the body of the rapidly stirred cold olefinic mixture. The polymerization reaction began immediately and proceeded rapidly to approximately 100% conversion of butyl-type rubber having a viscosity average molecular weight of 340,000 and 0.5 mole percent unsaturation.

BUTYL #2

A copolymer of isobutylene and isoprene was prepared by the same general process as for the copolymer designated as butyl #1 from a mixture of 97.5 parts by weight of isobutylene and 2.5 parts by weight of isoprene, except that continuous polymerization was used, the temperature was $-100°$ C., and the concentration of the catalyst was 5%. A conversion of about 100% of olefinic materials into rubbery polymer was obtained, the polymer having a viscosity average molecular weight of 330,000 and 1.3 mole percent unsaturation.

BUTYL #3

A copolymer of isobutylene was prepared by the same general process as for the copolymer designated as butyl #1, except that polymerization was at $-100°$ C. and the polymerizable mixture was of about 90 parts by weight of isobutylene and 10 parts by weight of isoprene and the catalyst concentration was about 7.5%. A conversion of olefinic materials into rubbery polymer of about 100% was obtained, the polymer having a mole percent unsaturation of 5.0% and a viscosity average molecular weight of 300,000.

BUTYL #4

A copolymer of isobutylene and butadiene was prepared according to the process of butyl #1 but at a polymerization temperature of $-78°$ C., employing a catalyst concentration of 5% and a ratio of isobutylene to butadiene of 97.5 parts by weight of isobutylene to 2.5 parts by weight of butadiene, the resulting polymer having a mole percent unsaturation of 1.2% and a viscosity average molecular weight of 330,000.

BUTYL #5

A copolymer of isobutylene and isoprene was prepared by the same general process as in the case of butyl #1 but at $-120°$ C. and from a mixture of about 96 parts by weight of isobutylene and about 4 parts by weight of isoprene and employing a catalyst concentration of about 5%, the resulting polymer having a mole percent unsaturation of 2% and a viscosity average molecular weight of 325,000.

BUTYL #6

A copolymer of isobutylene and isoprene was prepared by the same general process as for butyl #1, but at $-100°$ C. from a mixture of about 97.5 parts by weight of isobutylene and about 2.5 parts by weight of isoprene, and employing a catalyst concentration of about 7.5%, the resulting polymer being substantially identical to butyl #4.

BUTYL #7

A copolymer of isobutylene and isoprene was prepared by the same general process as in the case of butyl #1 but at a temperature of about $-160°$ C. and from a mixture of about 92 parts by weight of isobutylene and 8 parts by weight of isoprene and employing a catalyst concentration of about 7.5%, the resulting polymer had a mole percent unsaturation of 4% and a viscosity average molecular weight of 310,000.

BUTYL #8

A copolymer of isobutylene and butadiene was prepared by the same general process as in the case of butyl #1 from a mixture of 99 parts by weight of isobutylene and 1 part by weight of butadiene, the resulting polymer has a mole percent unsaturation of 0.5% and a viscosity average molecular weight of 320,000.

BUTYL #9

A copolymer of isobutylene and isoprene was prepared by the same general process as in the case of butyl #2 from a mixture of 80 parts by weight of isobutylene and 20 parts by weight of isoprene, the resulting copolymer had a mole percent unsaturation of 10% and a viscosity average molecular weight of 280,000.

Examples I–VII

Portions of the copolymers designated as butyl #1 to 9 are vulcanized by sulfur in composition with per 100 parts by weight of the copolymer, about 35–70 parts by weight of carbon black, about 3–10 parts by weight of zinc oxide and 0.25–2 parts by weight of tetramethyl thiuram disulfide.

The use of p-dinitrosobenzene, stearic acid, a plasticizer oil and benzothiazyl disulfide is optional. The vulcanization is for about 20–60 minutes at 295° F. to about 4–8 minutes at 350° F., the higher the vulcanizing temperature the shorter the permissible vulcanizing time and vice versa. The optimum vulcanization conditions appear to be within the range of about 7–30 minutes at about 315°–340° F.

EXAMPLE I 100 parts by weight of the copolymer designated as butyl #1 is admixed with 35 parts by weight of carbon black, 3 parts by weight of zinc oxide and 1.5 parts by weight of tetramethyl thiuram disulfide. Five weight percent of the above composition is vulcanized with 2 parts by weight of sulfur for 23 minutes at 330° F. The vulcanizate is then comminuted by means of a commercial rasp-type buffing machine made by the Retreading Equipment Co. and the comminuted rubber, known in the art as "tire buffings" containing tire shreds and fines and intermediate particles, etc., mixed in with the remaining 95 weight percent of the unvulcanized polymeric composition. The resulting composition is then vulcanized subsequently with 2 parts by weight of sulfur per 100 parts by weight of the copolymer for 23 minutes at 330° F. The resulting vulcanized rubber when applied in rubber tires is found to have an abrasion resistance and tread wear improvement of 3% as compared to tires made from all fresh polymer.

EXAMPLE II 100 parts by weight of the copolymer designated as butyl #7 is admixed with 70 parts by weight of carbon black, 0.1 part by weight of p-dinitrosobenzene, 1 part by weight of stearic acid, 10 parts by weight of zinc oxide, 10 parts by weight of a petroleum hydrocarbon plasticizer oil, 3 parts by weight of sulfur, 2 parts by weight of tetramethyl thiuram disulfide, and 2 parts by weight of benzothiazyl disulfide wherein the petroleum hydrocarbon plasticizer oil has the following properties:

|  | Minimum | Maximum |
|---|---|---|
| API° | 28 |  |
| Flash Point, °F. (open cup method) | 355 |  |
| Pour Point, °F. |  | 30 |
| SSU @ 100° F. | 105 | 115 |

Ten parts by weight of the above composition is vulcanized for 23 minutes at 330° F. and the resulting vulcanizate fabricated into a Butyl rubber tire. The tread area of such a worn tire is comminuted by means of a buffing machine and reblended into the remaining 90 weight percent of the unvulcanized composition. The resulting admixture is then fabricated into a Butyl rubber tire and vulcanized the equivalent of 23 minutes at 330° F. As compared to a Butyl rubber tire made from 100% fresh polymer of the same composition, the improvement in abrasive resistance and tread wear is 5%.

EXAMPLE III

The same procedure is employed as for Example I, except that 40 parts by weight of carbon black are employed, 0.5 part by weight of p-dinitrosobenzene, 1.0 part by weight of tetramethyl thiuram disulfide, and 2.0 parts by weight of benzothiazyl disulfide. Thirty percent of the above composition is then vulcanized for 23 minutes at 330° F. and the resulting vulcanizate is comminuted with a buffing machine and reblended with the remaining 70 parts by weight of unvulcanized polymeric composition. The resulting unvulcanized admixture is then extruded to a general contour suitable for applying as a tread, and is subsequently fabricated into a new rubber tire by freshening the underside with a suitable solvent such as hexane, rubber maker's naphtha, etc., by cementing the ends thereof, and finally by vulcanizing the composite for 23 minutes at 330° F. The noted improvement for abrasive resistance and tread wear after 5000 miles amounts to 6%.

EXAMPLE IV

The same general procedure is employed as in Example II except that the amount of carbon black is 65 parts by weight, there is no p-dinitrosobenzene added, and the plasticizer oil is also omitted. Fifteen weight percent of the above polymeric composition is then vulcanized for 60 minutes at 295° F. and is subsequently comminuted on a buffing machine and reblended with the remaining 85 weight percent of the polymeric composition. The resulting combined composition is then fabricated into a Butyl rubber tire and then vulcanized for the equivalent of 60 minutes at 295° F. After 5000 miles, an improvement in abrasive resistance and tread wear of the tire of 6% is noted.

EXAMPLE V

One hundred parts by weight of the copolymer designated as Butyl #3 is composited with 35 parts by weight of carbon black, 0.25 part by weight of p-dinitrosobenzene, 5 parts by weight of zinc oxide, 2 parts by weight of sulfur, 2 parts by weight of tetramethyl thiuram disulfide, and 2 parts by weight of benzothiazyl disulfide. Twenty weight percent of the above composition is then vulcanized for 4 minutes at 350° F., and the resulting vulcanizate is then comminuted by a buffing machine and reblended with the remaining 80% of unvulcanized composition and the subsequent composite is then vulcanized for 4 minutes at 350° F. after being applied as a Butyl rubber recap wherein the rubber cement comprises 100 parts by weight of the same isobutylene and isoprene copolymers in composition with:

30 parts by weight carbon black
5 parts by weight zinc oxide
1 part by weight tetra methyl thiuram disulfide
2 parts by weight sulfur
1 part by weight benzothiazyl disulfide and
5 parts by weight of a plasticizer oil having the following characteristics:

| | |
|---|---|
| SSU @ 100° F., sec. | 10,533 |
| SSU @ 210° F., sec. | 235 |
| Aniline point, °F. | 166 |
| Flash point, °F. | 525 |
| Pour point, °F. | 15 |
| Specific gravity | .960 |
| Color | Yellow |

The resulting recap as compared to a recap made of the same polymeric constituents where an all-fresh polymer is used gives a 7% improvement as to abrasive resistance and tread wear after 5000 miles.

EXAMPLE VI

One hundred parts by weight of the copolymer designated as Butyl #4 is admixed with 70 parts by weight of carbon black, 0.5 part by weight of paradinitrosobenzene, 10 parts by weight of zinc oxide, 4.0 parts by weight of sulfur and 1 part by weight of tetramethyl thiuram disulfide. Twenty-five weight percent of the above composition is then vulcanized for 20 minutes at 330° F. and the resulting vulcanizate is comminuted by means of a buffing machine and reblended back into the remaining 75 weight percent of the above composition. The resulting admixture is then vulcanized for 20 minutes at 330° F. after being formed into a tire. After 5,000 miles, the tire exhibits 6% improvement in abrasion resistance and tread wear.

EXAMPLE VII

A tire is prepared from a composition produced by the same general method as in Example VI except that for 100 parts of the copolymer, 50 parts by weight of carbon black is employed and 0.5 part by weight of stearic acid is also added as is one part by weight of benzothiazyl disulfide. The copolymer is a copolymer of 96 wt. percent of isobutylene and 4 wt. percent of isoprene. The above composition is then divided into two parts, one part containing 15 wt. percent of the composition which is then vulcanized for 28 minutes at 335° F., comminuted in a buffing machine and reblended with the remaining 85 wt. percent of the composition. The ultimate composition is then subsequently vulcanized for 28 minutes at 335° F. when applied as a butyl rubber tire. After 5,000 miles, an improvement in abrasive resistance and tread wear of 6% is noted as compared to a butyl rubber tire made from the same polymer but wherein all fresh polymer is employed.

EXAMPLE VIII

The copolymer designated as Butyl #6 is composited with the same ingredients as in Example I. However, the resulting composition is then divided into two portions and one portion containing 20% by weight is then vulcanized for 28 minutes at 335° F. The vulcanizate is then comminuted by means of a buffing machine and reblended with the remaining 80 wt. percent of the unvulcanized composition and the resulting composite is subsequently used in the construction of a butyl rubber tire and vulcanized for 28 minutes at 335° F. The improvement in abrasive resistance and tread wear after 5,000 miles is 6% as compared to the same butyl rubber tire of the same composition but wherein all fresh polymer was employed.

EXAMPLE IX

In order to compare the effect of various amounts of butyl rubber scrap in butyl rubber tires and tire treads, the following runs were made and all with the same composition as follows:

| | |
|---|---|
| Copolymer-Butyl #2 parts by weight | 100 |
| MPC Black parts | 50 |
| Polyac do | 0.5 |
| Stearic acid do | 0.5 |
| Zinc oxide do | 5 |
| Plasticizer oil do | 3 |
| Sulfur do | 2 |
| Tetramethylthiuramdisulfide do | 1 |
| Benzothiazyldisulfide do | 1 |

The butyl rubber plasticizer oil had the following properties:

| | Minimum | Maximum |
|---|---|---|
| A.P.I.° Gravity | 28 | |
| Flash Point (open cup method) °F | 355 | |
| Pour Point, °F | | 30 |
| S.S.U. at 100° F., seconds | 105 | 115 |

The butyl rubber, carbon black, Polyac and stearic acid were prepared as a masterbatch in one Banbury load or 400 lbs. During its preparation, the masterbatch was allowed to reach a temperature of 430° F., i.e., the reaction of the Polyac was completed. This single masterbatch was used in portions when needed, for the butyl, carbon black, Polyac and stearic acid requirements of all of the experiments in this example. The remaining ingredients shown in the formula were mill-mixed into the masterbatch, in the ratios shown, at the appropriate time needed.

A mixture of the completed tread compound was extruded into a form suitable for recapping, was cemented to butyl rubber tire casings with the cement subsequently shown in this example, and was molded to the casings for 100 minutes in a commercial type of recapping mold at 300° F. The tires, thusly recapped, were placed on an automobile and run for 6,400 miles. The tread recaps were then buffed off by means of a buffing machine, such as used in the recapping trade to obtain buffings of the general type described in Example I (supra). Care was exercised as regards depth of buffing, so as not to include in the buffings, composition other than that of the tread formulation shown.

A new mixture of the tread compound was then prepared. It was subsequently used in toto and in blends containing 9–25% of the aforementioned tread buffings, as shown in the formulation below. Blending was easily accomplished. To the new mixture on the mill was added the comminuted tread vulcanizate (the buffings), and blending was accomplished by usual milling technique. Other mixing equipment such as a Banbury mixer could also have been used.

| | A | B | C | D |
|---|---|---|---|---|
| New Mix | 100 | 91 | 83 | 75 |
| Buffings | | 9 | 17 | 25 |

The above compositions were extruded into form suitable for recapping (i.e. camelback), were cemented onto 6.70–15 butyl rubber tire casings and were molded for 100 minutes in a commercial type of recapping mold at 300° F. The butyl rubber containing cement compound was the following, used in the ratio of 20 wt. percent compound to 80 wt. percent hexane.

| | Parts by weight |
|---|---|
| Copolymer-Butyl #2 | 100 |
| MPC Black | 30 |
| Zinc oxide | 5 |
| Sulfur | 2 |
| Tetramethylthiuramdisulfide | 1 |
| Benzothiazyldisulfide | 1 |
| Plasticizer oil | 5 |

The plasticizer oil consists essentially of a petroleum oil having the following characteristics:

| | |
|---|---|
| SSU at 100° F., seconds | 10,533 |
| SSU at 210° F., seconds | 235 |
| Aniline point, °F. | 166 |
| Flash point, °F. | 525 |
| Pour point, °F. | 15 |
| Specific gravity | .960 |
| Color | Yellow |

The tires were then placed on an automobile and tested under normal use. The wheel positions of the tires were rotated periodically (about every 440 miles) so that each tire was on each wheel position twice and for the same number of miles (about 880 miles). The exact total number of miles was 3,492 and the tread depth loss was determined in inches as the average of 8 determinations in each of 6 tread grooves. For comparison purposes, the tire comprising 100% fresh mix was assigned a rating of 100 and the other treads were then "rated" against the control by dividing the loss for the experimental tread into the loss for the control and multiplying the result by 100. The results are now tabulated:

| Tread Wear After 3,492 Miles | A | B | C | D |
|---|---|---|---|---|
| Gauge Loss, inches | .085 | .083 | .080 | .080 |
| Rating | 100 | 102 | 106 | 106 |

The above data shows that employing the same butyl rubber composition and after a total of 3,492 miles, the composition B wore 2% better (i.e. 2% less wear) than composition A and compositions C and D also wore 6% better than the tire made entirely with fresh butyl rubber, i.e. composition A.

Assuming that a normal butyl rubber tire of 100% fresh butyl rubber would run for 30,000 miles; an improvement of 2% in tread wear (as in the case of composition B) will give an increased life expectancy of the tire of 600 miles. Also, an improvement of 6% in tread wear (in the cases of compositions C and D) will give an increased life expectancy of the tire of 1,800 miles. Thus, instead of reducing the quality of a butyl rubber tire when reducing its cost by extending it, according to the present invention, with unreclaimed comminuted vulcanized butyl rubber scrap, the quality was unexpectedly found to be improved. Obviously, other methods of obtaining comminuted butyl rubber may be used, such as by comminuting between corrugated rolls (e.g. "cracker-rolls"), and other machines adapted to crush, shear, tear, shred and/or grind the rubber.

While there are above described a number of specific embodiments of the present invention, obviously resort may be had to various other modifications and variations of the present invention without departing from the spirit of the invention or the scope of the appended claims.

What is claimed is:

1. In a tire, the combination comprising an open-bellied body terminating in spaced bead portions, air sealing means at said bead portions, and a tread area intermediate of said bead portions wherein said tread area comprises a vulcanized mixture of a major proportion of unvulcanized isoolefin-multiolefin butyl rubber copolymer and a minor proportion of unreclaimed comminuted vulcanized isoolefin-multiolefin butyl rubber copolymer scrap.

2. In a tubeless tire, the combination which comprises, an open-bellied body terminating in spaced bead portions, said body comprising at least three layers, an inner layer containing a rubber which has been at least partially vulcanized, an intermediate carcass layer including a rubber vulcanizate and a plurality of tire cords embedded in said vulcanizate, and an outer layer including a sidewall and tread area wherein at least the tread area comprises a vulcanized admixture containing about 70 to 95 weight percent of unvulcanized isoolefin-multiolefin butyl rubber copolymer and about 5 to 30 weight percent of unreclaimed comminuted vulcanized isoolefin-multiolefin butyl rubber copolymer scrap, the unvulcanized copolymer and the vulcanized comminuted copolymer scrap being of approximately the same composition.

3. In a tubeless tire, the combination which comprises, an inner layer of rubber, an intermediate layer defining a carcass portion including a rubber and a plurality of cords, and an outer layer including an open-bellied body comprising two opposing sidewalls, spaced bead portions, and a median area of said body defining a tread portion containing a vulcanized admixture of about 60 to 90 weight percent of an unvulcanized isoolefin-multiolefin butyl rubber copolymer and about 5 to 40 weight percent of unreclaimed comminuted vulcanized isoolefin-multiolefin butyl rubber copolymer scrap.

4. A process for forming an isoolefin-multiolefin butyl rubber copolymer containing composition of improved abrasion resistance which comprises mixing with about 70 to 90 weight percent of unvulcanized isoolefin-multiolefin butyl rubber copolymer, about 10 to 25 weight percent of unreclaimed comminuted vulcanized isoolefin-multiolefin butyl rubber copolymer scrap, and vulcanizing the resulting composition to produce a composition of increased abrasion resistance.

5. A process according to claim 4 wherein both butyl rubber copolymers comprise the copolymerization product of about 96 to 99 weight percent of isobutylene and about 4 to 1 weight percent of isoprene, 100 parts by weight of said copolymers both having been compounded prior to vulcanization with about 30 to 70 parts by weight of a carbon black.

6. An isoolefin-multiolefin butyl rubber copolymer and copolymer scrap-containing composition which, when vulcanized, exhibits improved abrasion resistance comprising about 60 to 95 weight percent of the unvulcanized butyl rubber copolymer and about 5 to 40 weight percent of the unreclaimed comminuted vulcanized butyl rubber copolymer scrap.

7. An isoolefin-multiolefin butyl rubber copolymer and copolymer scrap-containing tire of improved abrasion resistance containing a vulcanized mixture of about 75 to 90 weight percent of the butyl rubber copolymer and about 10 to 25 weight percent of unreclaimed comminuted vulcanized butyl rubber copolymer scrap of substantially the same composition as the unvulcanized copolymer.

8. A rubbery polymeric composition of improved abrasion resistance comprising a mixture of about 75–90 wt. percent of an unvulcanized polymer containing a major proportion of an iso-olefin and a minor proportion of a multi-olefin with about 10–25 wt. percent of an unreclaimed comminuted vulcanized copolymer containing a major proportion of an iso-olefin and a minor proportion of a multi-olefin; said mixture having been vulcanized at a temperature level between about 240° and 350° F. for between about 3 and 60 minutes.

9. Vulcanized rubbery polymer composition of improved abrasion resistance comprising the product obtained from vulcanizing about 60–95 wt. percent of an unvulcanized copolymer comprising the reaction product of about 70–99.5 parts by weight of a $C_4$–$C_7$ isoolefin and about 30–0.5 parts by weight of a $C_4$–$C_{14}$ conjugated diolefin with about 5–40 wt. percent of an unreclaimed comminuted vulcanized copolymer of about 70–99.5 parts by weight of a $C_4$–$C_7$ iso-olefin and about 30–0.5 parts by weight of a $C_4$–$C_{14}$ conjugated diolefin.

10. Vulcanizable rubbery polymeric composition comprising about 70–90 wt. percent of an unvulcanized copolymer containing about 90–99 wt. percent isobutylene and about 10–1 wt. percent isoprene with about 10–30 wt. percent of an unreclaimed comminuted vulcanized copolymer containing about 90–99 wt. percent isobutylene and about 10–1 wt. percent isoprene.

11. An isobutylene-diolefin butyl rubber copolymer-containing recap for an automobile tire comprising a vulcanized rubbery polymeric composition comprising about 75–90 wt. percent of an unvulcanized copolymer of about 90–99 parts by weight isobutylene and about 10–1 parts by weight of a $C_4$–$C_8$ conjugated diolefin with about 10–25 wt. percent of an unreclaimed comminuted vulcanized copolymer of about 90–99 parts by weight isobutylene and about 10–1 parts by weight of a $C_4$–$C_8$ conjugated diolefin.

References Cited in the file of this patent

UNITED STATES PATENTS

| | | |
|---|---|---|
| 2,378,717 | Macey | June 19, 1945 |
| 2,467,322 | Lightbown et al. | Apr. 12, 1949 |
| 2,583,387 | Morrissey et al. | Jan. 22, 1952 |